March 19, 1968     A. J. MUNN     3,373,764

HIGH FLOW RELIEF VALVES

Filed Feb. 17, 1966

INVENTOR
ALFRED J. MUNN
BY
AGENT

United States Patent Office 3,373,764
Patented Mar. 19, 1968

3,373,764
HIGH FLOW RELIEF VALVES
Alfred J. Munn, Wayne, N.J., assignor to Specialties Development Corporation, Belleville, N.J., a corporation of New Jersey
Filed Feb. 17, 1966, Ser. No. 528,301
1 Claim. (Cl. 137—469)

ABSTRACT OF THE DISCLOSURE

A high flow relief valve including a tubular body provided with an inlet and a tubular casing attached to the body and provided with an outlet in its side wall, a valve seat at the inlet, a valve member within the body, a piston in the casing carried by the valve member to regulate the flow through the outlet as the valve member moves and to be acted upon by the fluid flowing through the valve. The casing is adjustable to vary the position of the outlet with respect to the piston to adjust the operating characteristics of the valve.

---

The present invention relates to valves, and more particularly to high flow relief valves.

Conventional relief valves generally include an assembly having an inlet in communication with the fluid system to be relieved, a valve member for sealing the inlet positioned so as to be urged by the pressure at the inlet in a direction to unseal the inlet, and a spring for holding the valve member in the inlet sealing position until the pressure at the inlet reaches a predetermined pressure.

When the pressure at the inlet reaches this predetermined pressure, the valve member is moved against the spring and the valve opens slightly or "cracks." A further increase in the pressure causes the valve member to move further away from the inlet (thereby increasing the flow through the valve) until the spring force balances the force developed by this pressure. Therefore, the flow through the valve is directly proportional to the pressure at the inlet, and the pressure required to produce any substantial flow of fluid through the valve substantially exceeds the pressure at which the valve first opens.

It is an object of the present invention to provide a relief valve which goes from a closed position to a fully open condition in response to a small change in pressure.

Another object is to provide such a relief valve which resets itself when the pressure in the system being relieved drops to a predetermined value.

Another object is to provide such a relief valve which can be easily adjusted so that the cracking pressure, the pressure at maximum flow, and the reseating pressure are very close to each other.

A further object is to provide such a relief valve which is simple and inexpensive to manufacture.

According to the present invention, the foregoing objects are accomplished by providing in a fluid relief valve, flow increasing means responsive to the pressure of the fluid flowing through the valve, for moving the valve member to increase flow into the valve and for simultaneously increasing the flow through the valve outlet.

A preferred embodiment of the invention has been chosen for purposes of illustration and description, and is shown in the accompanying drawings, forming a part of the specification, wherein.

Figure 1:
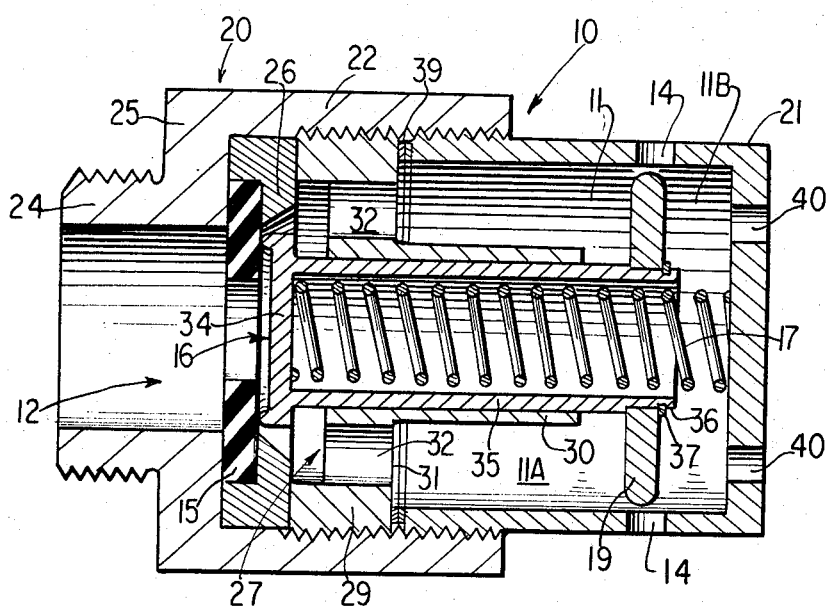
FIG. 1 is a longitudinal sectional view of a high flow relief valve in accordance with the present invention.

With reference to FIG. 1 of the drawings in detail, there is shown a high flow relief valve which generally includes a body 10 providing a chamber 11 having an inlet opening 12 and outlet openings 14, a valve seat 15 at the inlet, a valve member 16 within the chamber for engaging the valve seat to seal the inlet openings 12 from the chamber 11, and a flow increasing piston 19 carried by the valve member 16 and dividing the chamber into a first portion 11A and a second portion 11B.

The body 10 includes a stepped tubular formation 20 and a cup-shaped casing 21. The formation 20 comprises an internally threaded large diameter portion 22, a small diameter portion 24, and a shoulder 25 connecting the two portions 22 and 24. The small diameter portion 24 is externally threaded for connection to the fluid system to be relieved so that the pressure in that system is presented at the inlet 12.

The valve seat 15 is centered within the large diameter portion 22 of the formation 20 by a stepped washer 26 and is held against the shoulder 25 by a retainer 27 which is threaded into the formation portion 22.

The retainer 27 includes an externally threaded outer member 29, an elongated tubular inner guide member 30, and a wall 31 connecting the inner and outer members. The wall 31 is provided with a plurality of ports 32 to permit unrestricted flow between the inlet and the chamber portion 11A when the valve is open.

The valve member 16 includes a head portion 34 for engaging the seat 15 and a tubular portion 35 extending from the head portion through the guide member 30. The free end of the tubular portion 35 is provided with a reduced diameter section 36 upon which the piston 19 is seated. A split ring retainer 37 seated in an annular groove on the section 36 holds the piston 19 in position.

The casing 21 of the body 10 is provided with external threads at the open end thereof and is threaded into the formation portion 22. A number of shim washers 39 are positioned between the outer retainer member 29 and the open end of the casing 21 to position the casing so that the piston 19 provides a predetermined restriction to fluid flow through the openings 14. The closed end of casing 21 is provided with venting openings 40.

The spring 17 is positioned within the tubular valve member portion 35, and engages the closed end of the casing 21 and the head 34 of the valve member to force the head 34 against the valve seat. The spring is designed so that a predetermined pressure acting across the valve head 34 is required to crack the valve, that is, move the head 34 out of a sealing relationship with the valve seat.

In operation, when the pressure at the inlet 12 reaches the predetermined cracking pressure, the valve member 16 moves back slightly to allow fluid to flow into the chamber portion 11A. At this point, the valve head 34 has moved only very slightly and the initial flow into the chamber 11A is at a slow rate. In this initial condition, the fluid flowing into the chamber portion 11A is able to bleed out through the openings 14 at a comparable rate so that there is little increase in the pressure present in the chamber portion.

When the pressure at the inlet increases slightly above the cracking pressure, the valve member is moved further from the seat increasing the flow into the chamber portion 11A. Although the piston 19 is also moved to increase the effective area of the openings 14, the openings 14 and the piston 19 are sized and positioned so that at any subsequent position of the valve member, the rate at which fluid can flow into the chamber portion 11A is greater than the rate at which fluid can flow out of the chamber portion through the openings 14. The pressure in the chamber portion 11A therefore builds up and acts upon the piston 19 to drive the valve member into the fully open position.

The vent openings 40 are provided behind the piston 19 so that the piston compares the pressure in chamber portion 11A with atmospheric pressure.

As the pressure at the inlet decreases, the force due to pressure on the valve head 34 and on the piston 19 decreases and the spring returns the valve member to the closed position.

The pressure differentials between the cracking pressure, the pressure at which the valve is full open, and the pressure at which the valve head is again brought into sealing relationship with the valve seat are controlled by the initial positioning of the piston 19 with respect to the openings 14. When the openings 14 are almost completely covered by the piston 19, the cracking pressure and the full flow pressure are very close and the reseat pressure is considerably lower. When the openings 14 are completely unrestricted by the piston, the cracking pressure and the reseat pressure are very close, and the full flow pressure is considerably greater. An adjustment between these two extremes (by means of the shims 39) produces ideal results where all three pressures are of substantially the same value. For example, typical pressure valves for a 40 standard cubic feet per minute valve using a ¾-inch diameter valve head are 17.5 p.s.i. cracking pressure, 18.5 p.s.i. full flow pressure, and 16 p.s.i. reseat pressure.

Figure 2:
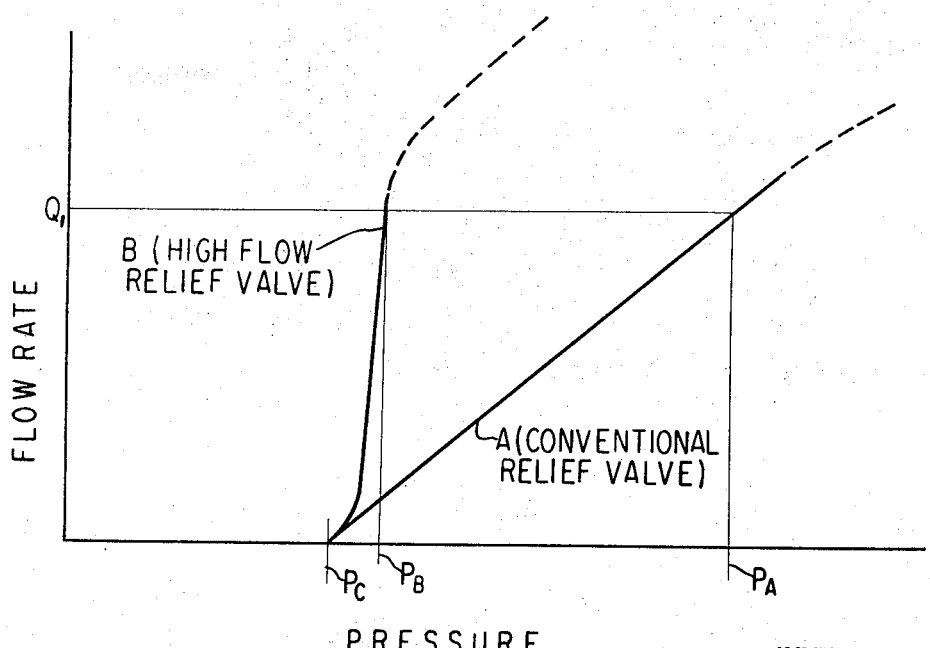
FIG. 2 is a graph comparing the pressure versus flow characteristics of the valve of the present invention with that of the conventional prior art relief valve.

In FIG. 2, the flow rate versus pressure characteristics of a typical relief valve according to the present invention are shown by the curve B, and for the purpose of comparison, the same characteristics of a typical relief valve of the conventional type are shown by the curve A. Both valves have a cracking pressure of $P_c$ and are designed to discharge fluid from the system to be relieved at the flow rate $Q_1$. The flow rate $Q_1$ is that rate at which fluid must be removed from a particular system in order to prevent the pressure in the system from building to a dangerous magnitude. The rate Q is determined by the parameters of the system, such as, the rate at which the system generates pressure and the flow restricting malfunctions which could occur.

It will be noted from FIG. 2 that if a conventional relief valve were used, the pressure in the system being protected would build to a value $P_a$ before the flow rate $Q_1$ is achieved. On the other hand, if the relief valve of the present invention were used, the pressure in the system would reach only $P_b$ and the system components could be made lighter and cheaper since the maximum pressure experience would be considerably lower.

It will be seen from the foregoing, that the present invention provides a simple and inexpensive relief valve which moves from a closed condition to a full open condition in response to a small pressure change, is resetting, and can be adjusted so that the cracking pressure is very close to the full flow pressure and to the reseating pressure.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A fluid pressure relief valve comprising a tubular body, a cup shaped casing having a tubular side wall concentric with said body and secured thereto at one end and having an end wall closing the other end, said body and said casing defining a chamber, means in said body providing an inlet aligned with the axis of said body, means providing an outlet in said side wall of said casing, a valve seat at said inlet, a valve member in said chamber for engaging said valve seat to seal said inlet from said chamber, spring means for holding said valve member against said seat until the inlet pressure acting on said valve member exceeds a predetermined value, a piston within said casing carried by said valve member and dividing said chamber into a first portion adjacent said inlet and a second portion separated from said inlet by said piston, means in said casing for venting said second chamber, said piston having a first piston surface acted upon by the pressure in said first chamber portion and a second piston surface acted upon by the pressure in said second chamber portion, said piston having an outlet diameter significantly smaller than the inner diameter of said casing to allow fluid to flow from said inlet past said piston to said outlet, said piston being positioned with respect to said outlet to partially restrict the flow path from said first chamber to said outlet when said valve is closed and to progressively offer a decreasing restriction to flow as the valve member moves away from said valve seat, said piston and said outlet being formed and positioned so that upon initial opening of the valve the flow into said first chamber portion equals the flow through said outlet and as said valve member continues to move away from said valve seat the flow into said first chamber portion becomes greater than the flow through said outlet, and said casing being longitudinally movable with respect to said body to vary the position of said outlet with relation to said piston to change the relationship of the reseating pressure and the full flow pressure to the cracking pressure.

References Cited

UNITED STATES PATENTS

| | | | |
|---|---|---|---|
| 935,709 | 10/1909 | Turner | 137—469 |
| 1,891,119 | 12/1932 | Stover | 137—469 X |
| 2,292,294 | 8/1942 | Rotter et al. | 137—469 |
| 2,440,961 | 5/1948 | Link | 137—503 X |
| 1,152,733 | 9/1915 | Houser | 137—478 |

FOREIGN PATENTS 1,955 7/1857 Great Britain.

M. CARY NELSON, *Primary Examiner.*

HENRY T. KLINKSIEK, *Examiner.*

R. J. MILLER, *Assistant Examiner.*